(12) United States Patent
Pradhan

(10) Patent No.: US 11,437,185 B2
(45) Date of Patent: Sep. 6, 2022

(54) TEMPERATURE BASED FLUID LEVEL ESTIMATION IN AN ELECTRICAL DEVICE

(71) Applicant: Simit Pradhan, Karnataka (IN)

(72) Inventor: Simit Pradhan, Karnataka (IN)

(73) Assignee: Siemens Aktiengesellschaft, Munich (DE)

( * ) Notice: Subject to any disclaimer, the term of this patent is extended or adjusted under 35 U.S.C. 154(b) by 115 days.

(21) Appl. No.: 16/901,115

(22) Filed: Jun. 15, 2020

(65) Prior Publication Data

US 2020/0411233 A1 Dec. 31, 2020

(30) Foreign Application Priority Data

Jun. 27, 2019 (IN) .............................. 201941025680

(51) Int. Cl.
*H01F 27/40* (2006.01)
*G01F 23/22* (2006.01)
(Continued)

(52) U.S. Cl.
CPC .......... *H01F 27/402* (2013.01); *G01F 23/22* (2013.01); *H01F 27/10* (2013.01); *H01F 7/04* (2013.01);
(Continued)

(58) Field of Classification Search
CPC ........ H01F 27/10; H01F 27/12; H01F 27/402; H01F 2027/404; H01F 2027/406;
(Continued)

(56) References Cited

U.S. PATENT DOCUMENTS

| 6,536,276 | B2 * | 3/2003 | Huss ....................... G01F 23/22 |
| | | | 73/295 |
| 6,568,263 | B1 * | 5/2003 | Snelling ................ G01F 23/247 |
| | | | 340/622 |

(Continued)

FOREIGN PATENT DOCUMENTS

| WO | 2015161246 A1 | 10/2015 | |
| WO | WO-2015161246 A1 * | 10/2015 | ........... B05B 7/2489 |

OTHER PUBLICATIONS

Indian Office Action for Indian Patent Application No. 201941025680 dated Jun. 18, 2021.

*Primary Examiner* — Yemane Mehari
(74) *Attorney, Agent, or Firm* — Lempia Summerfield Katz LLC

(57) ABSTRACT

A method and system for predicting performance of a fluid filled electrical device are provided. The system includes a sensing unit operable communicating with a fluid level estimation system. The sensing unit includes one or more sensors physically mountable on and/or around the electrical device, recording temperature data associated with the fluid and the ambient environment. The fluid level estimation system determines temperatures of the fluid and a an ambient temperature, generates feature vectors for one or more of the temperatures based on their correlation with the ambient temperature, and estimates a fluid level inside the electrical device and thereby the performance, based on the feature vectors and a probability density function derived from a distribution constructed using historical temperature gradient data associated with the electrical device.

14 Claims, 9 Drawing Sheets

(51) Int. Cl.
*H01F 27/10* (2006.01)
*H02H 5/06* (2006.01)
*H01F 7/04* (2006.01)
*H02H 5/08* (2006.01)

(52) U.S. Cl.
CPC ............... *H01F 2027/404* (2013.01); *H01F 2027/406* (2013.01); *H02H 5/06* (2013.01); *H02H 5/08* (2013.01)

(58) Field of Classification Search
CPC ............ H01F 7/04; G06F 17/15; H02H 5/06; H02H 5/08; G01F 23/0076; G01F 23/22
See application file for complete search history.

(56) References Cited

U.S. PATENT DOCUMENTS

| | | | |
|---|---|---|---|
| 8,384,538 B2 * | 2/2013 | Breed | B60R 25/257 340/500 |
| 2019/0063980 A1 * | 2/2019 | Kobs | A47K 5/16 |

* cited by examiner (PRIOR ART)

TEMPERATURE BASED FLUID LEVEL ESTIMATION IN AN ELECTRICAL DEVICE

CROSS REFERENCE TO RELATED APPLICATIONS

This application claims the benefit of IN 201941025680 filed on Jun. 27, 2019, which is hereby incorporated by reference in its entirety.

FIELD

Embodiments relate to monitoring and maintenance of electrical power industry equipment and to an electrical device including a housing such as a tank, a core, and a cooling unit including for example, one or more radiator fins.

BACKGROUND

A commonly known electrical device is a transformer, for example an oil-cooled transformer, or a reactor. Transformers are widely used as devices to step-down voltage levels so as to enable transfer of power over long distances from the power plants. Depending on the electric power that a transformer handles, transformers are classified as power transformers (>200 MVA) or distribution transformers (<200 MVA). Since the transformers step down voltages at such high power, any loss in efficiency during this process results in the power loss being converted to heat.

FIG. 1 depicts a thermal model of a transformer 100, of the state of the art. The transformer 100 includes a housing 101, a core 102 positioned inside the housing 101, a winding element 103 at least partially surrounding the core 102 such that the core 102 and the winding element 103 are immersed in a fluid 106, for example, any insulating fluid 106 such as oil, a conservator 104 accommodating expansion of the fluid volume based on temperature variations, and a cooling unit 105 including, for example, one or more radiator fins, for heat dissipation. Power lost from the core 102 and windings 103 of the transformer 100 when in operation, is carried to the ambient environment surrounding the transformer 100, via a bath of oil 106, as indicated by the heat flow arrows $q_{loss}$, $q_{oil}$, and $q_{env}$. The oil 106 is circulated through the radiator fins 105 indicated by the oil flow arrows for heat dissipation. The oil 106 acts as a medium for heat dissipation by convection thereby, preventing the transformer 100 from heating up beyond its rated capacity. As the transformer 100 ages, it is likely that the conservator 104, the housing 101, and/or the radiator fins 105 develop cracks due to which the oil 106 may leak out over a period of time. When the oil-level falls below a certain threshold, the transformer 100 overheats and if the overheating continues there is a risk of the transformer 100 exploding causing loss of life and property. In order to prevent this from happening, it is important to monitor level of the insulating fluid 106 in the transformer 100 and trigger a refill request when this level falls below a predefined threshold. Moreover, thefts of oil 106 from the transformers 100 are also reported in certain geographies especially remote ones. It is, therefore, necessary to detect the thefts and raise an alarm to refill the lost oil 106 so as to avoid a catastrophic failure of the transformers 100.

Conventional transformers have a built-in sensing technique of measuring pressure at the bottom of the transformer tank in order to determine level of insulating fluid contained within the transformer. However, this is limited only to heavy-duty transformers that supply power to a lot of distribution transformers in the grid. For a distribution transformer, existence of such sensing methods is not known. Moreover, employing pressure sensing technique is not feasible for transformers that are already commissioned and installed, as it is an invasive technique that requires fitting an invasive sensing device on the transformers and calls for decommissioning of the transformers, as well as the oil from them to be drained. This is a huge effort and causes inconvenience during power outage. Furthermore, in geographies where theft of oil is common, theft of such pressure sensors may also occur thereby, rendering the technique to be very costly.

Conventional non-invasive techniques known in the art for sensing parameters such as a level, a mass, a volume, etc., of a fluid in a fluid filled electrical device, for example, an oil filled transformer based on temperature involve a continuous parameter sensing. This calls for a large amount of data to be recorded continuously resulting in a huge amount of processing time and effort. Moreover, such techniques may require a power loss measurement to be made by sensing current and voltage at the input and the output of the transformer further complicating the data acquisition and increasing overall cost of the sensing.

BRIEF SUMMARY AND DESCRIPTION

The scope of the present disclosure is defined solely by the appended claims and is not affected to any degree by the statements within this summary. The present embodiments may obviate one or more of the drawbacks or limitations in the related art.

Embodiments provide an electrical device, a system, and a method that predicts performance of the electrical device by sensing level of oil therein in a non-invasive and cost-efficient way thereby, being viable for retrofitting on the deployed electrical devices on the field, and without requirement of power loss measurements.

The electrical device employs a method and a system for predicting performance of a fluid filled electrical device based on a level of the fluid inside the electrical device, and for example a normalcy of the fluid level, using temperature associated with the fluid and temperature of ambient environment surrounding the electrical device.

According to an embodiment, a system for predicting performance of a fluid filled electrical device is provided. As used herein, the electrical device refers to any fluid cooled electrical device such as a motor, a transformer, a reactor, etc. The electrical device includes a housing, that is a tank, a core positioned inside the housing, and at least one cooling unit operably attached to the housing. The electrical device may include a winding element partially surrounding the core. The cooling unit may employ an active cooling such as forced convection and/or a passive cooling such as natural convection. The cooling unit includes, for example, a plurality of radiator fins at least partially surrounding the transformer tank. The core and the winding element, if present, are at least partially immersed in the fluid for cooling and electrical insulation. As used herein the term "fluid" refers to one or more insulating media employed in any electrical device for insulation and cooling of the electrical device. The fluid includes, for example, insulating liquids such as mineral oil, silicone liquid, synthetic esters, natural esters, etc., or insulating gases such as sulphur hexafluoride $SF_6$. Also, used herein, the term "performance" refers to, a probability of failure of the electrical device. The system predicts the performance by estimation a level of the fluid inside the electrical device based on temperature of the fluid and an ambient environment surrounding the electrical device.

The system includes a sensing unit and a fluid level estimation system in operable communication with one another via a wired and/or a wireless communication network. According to an embodiment, the sensing unit is deployable on the electrical device and/or in proximity of the electrical device and is in communication with the fluid level estimation system via a communication network. In this embodiment, the fluid level estimation system is implemented in a cloud computing environment. As used herein, "cloud computing environment" refers to a processing environment including configurable computing physical and logical resources, for example, networks, servers, storage, applications, services, etc., and data distributed over a communication network, for example, the internet. The cloud computing environment provides on-demand network access to a shared pool of the configurable computing physical and logical resources. In this embodiment, the fluid level estimation system is a cloud computing-based platform implemented as service processing information collected from the sensing unit for predicting performance of the electrical device. In this embodiment, the fluid level estimation system is developed, for example, using the Google App engine cloud infrastructure of Google Inc., Amazon Web Services® of Amazon Technologies, Inc., the Amazon elastic compute EC2® web service of Amazon Technologies, Inc., the Google® Cloud platform of Google Inc., the Microsoft® Cloud platform of Microsoft Corporation, etc.

According to another embodiment, the fluid level estimation system is configured as a web-based platform, for example, a website hosted on a server or a network of servers.

According to another embodiment, the fluid level estimation system includes a fluid level estimation software application that is downloadable on a user device and is accessible by users, for example, management staff at an installation site of the transformer or the staff responsible for maintenance of the transformer. As used herein, "user device" refers to electronic devices, for example, personal computers, tablet computing devices, mobile computers, mobile phones, smart phones, portable computing devices, any other suitable computing equipment, combinations of multiple pieces of computing equipment, etc.

According to another embodiment, the sensing unit and the fluid level estimation system are deployable on one or more parts of the electrical device and/or in proximity of the electrical device and are in communication with each other via a wired communication network or a wireless short-range communication network. In this embodiment, the system acts as an intelligent edge device including a fluid level estimation system deployable on and/or in proximity of the electrical device processing information collected from the sensing unit and estimating one or more parameters associated with the fluid. As used herein the communication network, refers to, for example, any wired or wireless network such as the internet, an intranet, that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of the networks.

The fluid level estimation system predicts a level of the fluid inside the electrical device, based on the temperature data recorded by the sensing unit. The fluid level estimation system predicts a normalcy associated with the level of the fluid merely based on temperature data and without requiring measurement of data pertaining to a power, a voltage, a current, etc., of the electrical device. As used herein, the term "normalcy" refers to a fluid level that allows the electrical device to function normally.

The sensing unit includes one or more sensors recording the temperature data. Each sensor is a temperature sensor. Each sensor physically mountable on the electrical device is a non-invasive type of sensor. The temperature data includes data recorded by each of the sensors of the sensing unit at respective positions where the sensors are mounted. The sensing unit includes at least one sensor physically mountable on a housing of the electrical device, at least one sensor physically mountable on a cooling unit, that is, a radiator fin of the electrical device, and at least one sensor physically mountable in proximity of the electrical device in an ambient environment surrounding the electrical device. The sensing unit may include a sensor physically mountable on a fluid storage component, that is, a conservator of the electrical device.

Thus, the sensing unit records temperature data associated with at least an ambient environment surrounding the electrical device and with the fluid filled in the electrical device, at pre-determined locations on and around the electrical device. As used herein, "pre-determined locations" refer to one or more areas on the electrical device and in proximity of the electrical device where sensors of the sensing unit are physically mounted for recording the temperature data associated with the fluid and the ambient environment. Advantageously, the pre-determined locations on the electrical device include at least a location on top of a cooling unit of the electrical device, that is, a radiator fin and a location on a top of the housing of the electrical device.

According to another aspect, the pre-determined locations on the electrical device may include one or more locations on the body of the electrical device such as on the housing, on the conservator, etc., where the sensors when mounted will record temperature data at respective locations leading to an increase in granularity of the overall temperature data recorded thereby, enhancing the performance prediction of the electrical device. According to this aspect, the sensors provide redundancy required in determining accurate temperature readings of the fluid inside the electrical device. According to this aspect, for an electrical device such as a distribution transformer including a conservator accommodating expansion of the fluid with temperature variations, the sensors of the sensing unit are positioned at locations including, for example, a top of the conservator, a bottom of the conservator, at least one leg of the conservator connecting the conservator to the tank of the transformer, a top of the tank, a top of the cooling unit such as a radiator fin, and a bottom of the radiator fin.

The pre-determined locations around the electrical device include at least one location in close proximity of the electrical device where the sensor of the sensing unit when mounted may record ambient temperature. As used herein, the term "proximity" refers to a range of distance of about 1 meter to about 5 meters from the electrical device.

According to yet another embodiment, each of the sensors are configured with a positioning unit, for example, a global positioning system (GPS) so that their relative positional co-ordinates may be mapped by the fluid level estimation system and/or displayed to a user using the fluid level estimation system.

Embodiments provide a fluid level estimation system configured for estimating a level of the fluid inside an electrical device, and for example, a normalcy of the fluid level inside the electrical device. The fluid level estimation system includes a non-transitory computer readable storage medium and at least one processor communicatively coupled to the non-transitory computer readable storage medium. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. The non-transitory computer readable storage medium is configured to store computer program instructions defined by modules, of the fluid level estimation system. The processor is configured to execute the defined computer program instructions.

The fluid level estimation system includes a data communication module communicating with the sensing unit including one or more sensors deployable at pre-determined locations on and around the electrical device. The data communication module receives temperature data associated with the fluid and ambient environment surrounding the electrical device recorded by the sensors of the sensing unit. The data communication module is in a continuous communication with the sensing unit to receive real time data associated with the electrical device.

The fluid level estimation system includes a temperature determination module. The temperature determination module processes the temperature data to determine one or more temperatures $\ominus_{S1}$, $\ominus_{S2}$, $\ominus_{ref}$, associated with the fluid and recorded at the pre-determined locations on the electrical device, and an ambient temperature $\ominus_{ambient}$ of the ambient environment recorded at the pre-determined location around the electrical device. The temperature determination module processes the temperature data at least via filtering so as to retain minimal measurement noise if present any. The temperature determination module may further process the temperature data by amplification, isolation, error compensation, linearization, and/or excitation, to determine the temperatures associated with the fluid and the ambient environment.

The fluid level estimation system includes a feature vector generation module. The feature vector generation module generates feature vectors for one or more temperatures $\ominus_{S1}$, $\ominus_{S2}$ of the fluid, using a reference temperature $\ominus_{ref}$ of the fluid and the ambient temperature $\ominus_{ambient}$. As, used herein "reference temperature" refers to a temperature derived from the temperature data recorded by a sensor $S_{ref}$ positioned at the cooling unit, that is, a top of a radiator fin for example, of an oil-filled transformer. This temperature serves as a reference temperature. A top of the radiator fin is typically close to a level at which the transformer core is positioned. When the oil level drops below the core level, risks such as air discharge rise substantially, and the performance of the transformer drops drastically. It is unlikely that a transformer works normally when the oil falls beyond this level. Therefore, this level at the radiator fin top is considered as a reference level and the oil-temperature at this level as a reference temperature. The feature vector generation module determines a correlation of at least one of the temperatures of the fluid $\ominus_{S1}$ or $\ominus_{S2}$ with respect to the ambient temperature $\ominus_{ambient}$, and a correlation of the reference temperature $\ominus_{ref}$ with respect to the ambient temperature $\ominus_{ambient}$, over a time period. Each of the correlations are temperature gradients at locations S1 and/or S2 and Sref. The temperature gradients form the feature vector. The feature vector thus includes two quantities therewithin. A first quantity is a correlation of the reference temperature of the fluid $\ominus_{ref}$ with respect to the ambient environment $\ominus_{ambient}$. A second quantity is a correlation of fluid temperatures $\ominus_{S1}$ and/or $\ominus_{S2}$ with respect to the ambient environment $\ominus_{ambient}$. Thus, a feature vector $F_n$ may be represented by the below formula:

$$F_n = [(\ominus_{ref} - \ominus_{ambient})(\ominus_{Sn} - \ominus_{ambient})]$$

where, n is a number of sensors physically mounted on an electrical device except the sensor mounted at radiator fin top and a sensor mounted in proximity of the electrical device, $\ominus_{ref}$—reference temperature derived from temperature data measured by a reference sensor $S_{ref}$ positioned at a cooling unit, $\ominus_{ambient}$—ambient temperature derived from temperature data measured by a sensor $S_{ambient}$ positioned in proximity of the electrical device, and $\ominus_{Sn}$—fluid temperature derived from temperature data measured by sensors S1-Sn positioned on the electrical device. Thus, the feature vector generation module generates feature vectors $F_1$, $F_2$, $F_3$, ... $F_n$ etc., for each of the temperatures recorded by the sensors S1-Sn physically mounted at n number locations on the electrical device.

According to an aspect, the feature vectors $F_n$ are stored in a parameter database of the fluid level estimation system.

The fluid level estimation system includes a level prediction module. The level prediction module predicts a level, that is, a normalcy of the level of the fluid inside the electrical device based on the feature vectors and historical temperature gradient data associated with the electrical device. As used herein, "historical temperature gradient data" refers to feature vectors generated by the fluid level estimation system and stored in a parameter database of the fluid level estimation system. The fluid level estimation system functions in two modes, a learning mode and an operational mode. A mode selection module of the fluid level estimation system selects a mode of operation. According to one aspect, the mode selection module receives a user input regarding mode of operation. For example, the fluid level estimation system functions in the learning mode before being deployed on field. In another example, the fluid level estimation system functions in the learning mode for a predefined time period after being installed on an electrical device, that is, on field. According to one aspect, in the learning mode, the fluid level estimation system receives the temperature data from a pre-stored reference dataset. According to another aspect, in the learning mode, the fluid level estimation system receives temperature data from the sensing unit. In the learning mode, a gradient management module of the level prediction module generates a distribution of feature vectors $F_1$, $F_2$, and/or $F_n$, for one or more of the temperatures $\ominus_{S1}$, $\ominus_{S2}$ and/or $\ominus_{Sn}$. The gradient management module generates the distribution, that is, a plot for $F_n$ including its first quantity ($\ominus_{ref} - \ominus_{ambient}$), that is, temperature gradient at $S_{ref}$ represented on X-axis and its second quantity ($\ominus_{Sn} - \ominus_{ambient}$), that is, temperature gradient at $S_n$, on a Y-axis over a period of time $T_n$.

A threshold determination module determines a fluid level threshold based on the distribution. The fluid level threshold indicates a probability of normalcy of operation, that is, of a normal fluid level inside, an electrical device. The term "distribution" refers to a probability density function that determining boundary temperature gradients, for example bounds of first and second quantities of the feature vectors, under normal oil level condition of a transformer. This in turn, helps in determining whether the distribution is anomalous or not. The boundaries may be calculated based on the formula below where $P(F_n)$ represents an area, such as a reference ellipse, on the distribution plot representing a normal fluid level: $P(F_n)=MVPDF[F_n, \mu(F_n), \sigma(F_n)]$ where MVPDF—multi-variate normal probability density function, $F_n$—feature vector for temperature data recorded by sensor $S_n$, $\mu$—average of $F_n$, $\sigma$—standard deviation of $F_n$.

Using the probability density function as a detection metric for fluid level estimation provides capture of corner cases like very high loading or very low loading conditions of the electrical device. The fluid level threshold is calculated from the boundaries, for example, the reference ellipse using below formula:

$$T(F_n)=P(\mu(F_n)\pm 6\sigma(F_n))$$

where $T(F_n)$—fluid level threshold, for example, a fluid level defining a normal fluid level and in turn operation and/or performance of the electrical device.

The level prediction module stores the distribution, the boundaries calculated for normal fluid level, and a fluid level threshold derived from the same, in the parameter database. Once the data is stored in the parameter database, the fluid level estimation system may function in the operational mode. In the operation mode, a parameter comparison module of the level prediction module compares the feature vectors with fluid level threshold so as to determine whether a level of the fluid is at, below, or above the normal fluid level. The parameter comparison module performs the aforementioned comparison by evaluating a probability of feature vectors constructed from temperature data recorded in real-time, that is, operational mode by the sensing unit, given a distribution of the historical temperature gradient data generated in learning mode. For example, the fluid level estimation system constructs feature vectors for every incoming temperature sensor data in operational mode, generates a distribution for the same, and calculates the $P(F_n)$, that is, the multi-variate probability distribution function and compares the same with the fluid level threshold $T(F_n)$ obtained using reference data, that is, a distribution of the feature vector temperature gradients constructed in learning mode.

According to another aspect, in addition to using the fluid level threshold $T(F_n)$, calculated based on the distribution, peripheral factors such as shape of the distribution, that is, the reference ellipse indicated by $P(F_n)$ may be used for estimating the fluid level. According to this aspect, a shape of the distribution plotted for feature vectors recorded in real time, that is, in operational mode, will be compared with the shape of the distribution stored in the parameter database as a reference ellipse.

According to one aspect, the level prediction module initiates one or more notifications based on the level of the fluid predicted. The notifications include, for example, a fluid theft alarm, a low fluid level alarm, and/or a critical fluid level alarm. The notifications are communicated to the users such as the maintenance crew of a substation who may then initiate actions accordingly well in advance and prevent drastic situations such as explosion of electrical devices.

According to another aspect, the fluid level estimation system includes a data learning module storing the parameters in a parameter database. In this embodiment, the data learning module provide inputs to the level prediction module of the fluid level estimation system for validating the fluid level based on the stored one or more parameters. For example, the data learning module, by employing heuristics based artificial intelligence algorithms generates inferences each time the fluid level estimation system estimates the fluid level. These inferences are stored in the parameter database for future estimation, such that there is a plausibility check implemented based on the historical results.

Also disclosed herein, is a method for predicting performance of a fluid filled electrical device of the aforementioned kind including a housing, a core at least partially immersed in the fluid, and at least one cooling unit. The method includes receiving from a sensing unit temperature data associated at least with an ambient environment surrounding the electrical device, recorded by a sensor $S_{ambient}$ of the sensing unit, and with fluid filled in the electrical device recorded by the sensors, $S2$, and $S_{ref}$ of the sensing unit 201 at pre-determined locations on the electrical device. The method includes determining from the temperature data, temperatures $\Theta_{S1}$, $\Theta_{S2}$, $\Theta_{ref}$, and $\Theta_{ambient}$ at the pre-determined locations on the electrical device and the ambient environment surrounding the electrical device. For determining the temperatures $\Theta_{S1}$, $\Theta_{S2}$, $\Theta_{ref}$, and $\Theta_{ambient}$, the method processes the temperature data to filter noise and other background disturbances present, if any.

The method includes generating feature vectors for one or more of the temperatures $\Theta_{S1}$, $\Theta_{S2}$ ... $\Theta_{Sn}$ using the reference temperature $\Theta_{ref}$ and an ambient temperature $\Theta_{ambient}$. The feature vectors are calculated in the aforementioned manner by calculating temperature gradients. The method includes determining a correlation of at least one of the temperatures $\Theta_{S1}$, $\Theta_{S2}$ ... $\Theta_{Sn}$ with respect to the ambient temperature $\Theta_{ambient}$ and a correlation of the reference temperature $\Theta_{ref}$ with respect to the ambient temperature $\Theta_{ambient}$, over a time period for which the temperatures are recorded by the sensing unit 201. The correlations are the temperature gradients that form co-ordinates of the feature vectors. The method includes predicting a level of the fluid inside the electrical device, based on the feature vectors and historical temperature gradient data associated with the electrical device. The method includes generating, using the historical temperature gradient data associated with the electrical device, a distribution of feature vectors for the temperatures $\Theta_{S1}$, $\Theta_{S2}$ ... $\Theta_{Sn}$. The method includes, determining a fluid level threshold based on the distribution of the feature vectors. The fluid level threshold is determined by computing a multi-variate probability distribution function from the distribution. The method includes, storing the fluid level threshold and the distribution in a parameter database of the fluid level estimation system. The method includes, comparing the feature vectors, and for example a probability of a feature vector, calculated for at least one of the temperatures $\Theta_{S1}$, $\Theta_{S2}$ ... $\Theta_{Sn}$ recorded in real time, with the fluid level threshold stored in the parameter database, to predict whether the fluid level is below normal or at normal level. This is achieved by plotting a distribution of the feature vectors corresponding to real time temperature data and comparing the same with the distribution stored in the parameter database. The threshold for deviation between the distributions is considered as the $T(F_n)$ based on which the method predicts the fluid level inside the electrical device. The method further includes initiating one or more notifications based on the level of the fluid predicted. The notifications include, for example, a fluid theft alarm, a low fluid level alarm, a critical fluid level alarm, etc.

DETAILED DESCRIPTION

Figure 1:
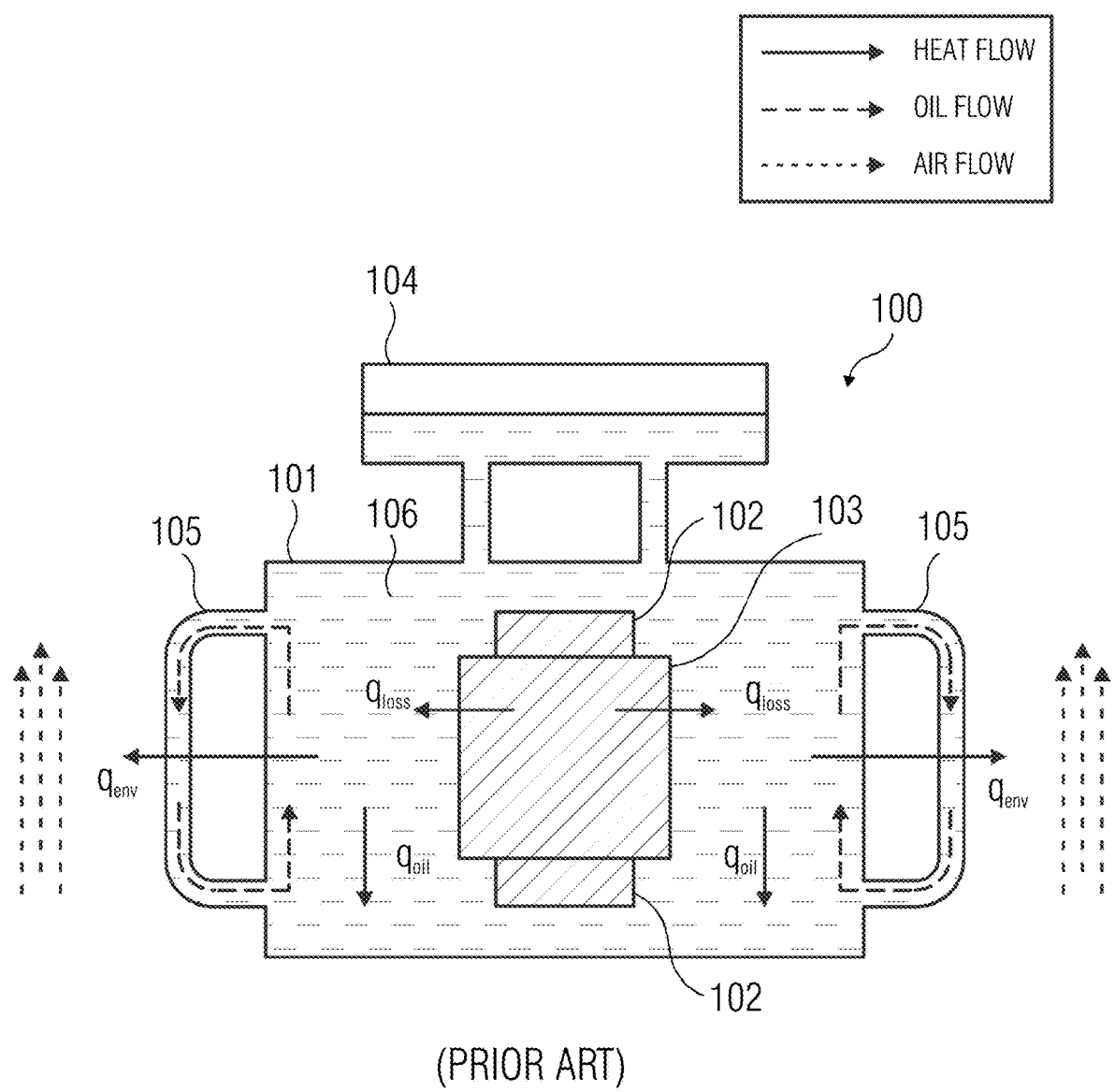
FIG. 1 depicts a sectional view of an active part of an electrical device of the state of the art.

Various embodiments are described with reference to the drawings, wherein like reference numerals are used to refer to like elements throughout. In the following description, for the purpose of explanation, numerous specific details are set forth in order to provide thorough understanding of one or more embodiments. It may be evident that such embodiments may be practiced without the specific details.

Figure 2A:
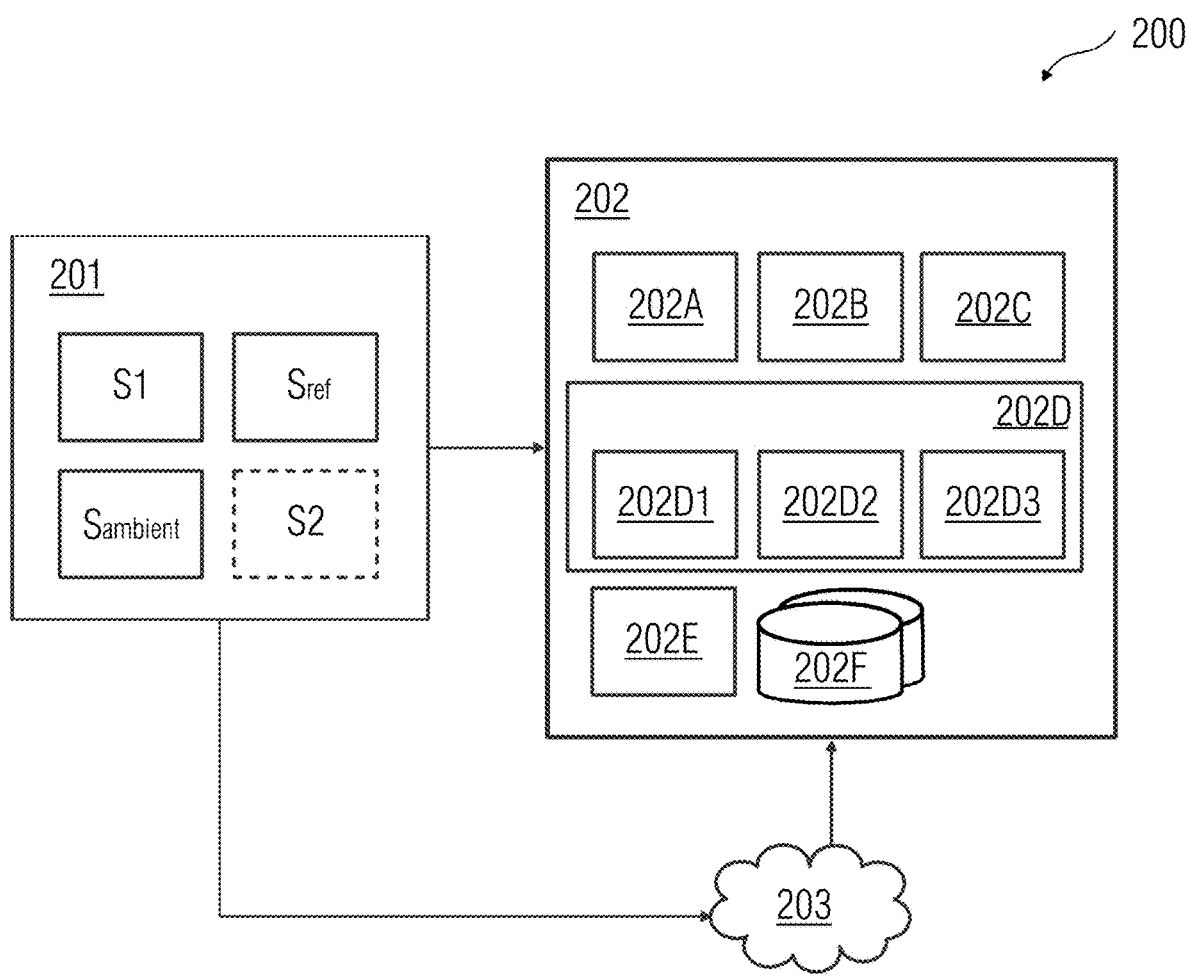
FIGS. 2A-2B depict a system deployable on a fluid filled electrical device and including a sensing unit and a fluid level estimation system, for predicting performance of the fluid filled electrical device according to an embodiment.

FIG. 2A depicts a system 200 deployable on an electrical device and including a sensing unit 201 and a fluid level estimation system 202, for predicting performance of the fluid filled electrical device. The sensing unit 201 and the fluid level estimation system 202 are in operable communication with one another via a wired and/or a wireless communication network 203. The sensing unit 201 includes sensors S1, $S_{ref}$ and $S_{ambient}$, physically mountable on the electrical device for recording temperature data at various locations on and/or around the electrical device based on the positions at which each of the sensors S1, $S_{ref}$ and $S_{ambient}$ are mounted. The sensors S1 and $S_{ref}$ record temperature data of the fluid and the sensor $S_{ambient}$ records temperature data of ambient environment surrounding the electrical device. The sensing unit 201 may have more sensors, for example, a sensor S2, mounted on the electrical device and recording temperature data of the fluid for increasing granularity of the readings. The sensors S1, $S_{ref}$ and $S_{ambient}$, etc., are temperature sensors.

The fluid level estimation system 202 includes a data communication module 202A, a temperature determination module 202B, a feature vector generation module 202C, a level prediction module 202D, a data learning module 202E, and a parameter database 202F. The data communication module 202A periodically establishes communication with the sensors S1, $S_{ref}$ and $S_{ambient}$ of the sensing unit 201 over the communication network 203 and receives the temperature data recorded by each of the sensors S1, $S_{ref}$ and $S_{ambient}$ over a time window since the last communication was established. The data communication module 202A also receives a physical location of each of the sensors S1, $S_{ref}$, and $S_{ambient}$ mounted on the electrical device where the temperature data has been recorded. The temperature determination module 202B determines one or more temperatures $\Theta_{S1}$ and/or $\Theta_{S2}$, based on the number of sensors S1 and/or S2 deployed on the electrical device, a reference temperature $\Theta_{ref}$ associated with the fluid at the pre-determined locations on the electrical device, and an ambient temperature $\Theta_{ambient}$ of the ambient environment by processing the temperature data recorded by the sensors S1 and/or S2, $S_{ref}$, and $S_{ambient}$, with respect to various time instants in the time window. The temperature determination module 202B samples and filters the temperature data to reduce measurement noise that may have been recorded by the sensors S1 and/or S2, $S_{ref}$ and $S_{ambient}$ in order to obtain the temperatures $\Theta_{S1}$ and/or $\Theta_{S2}$, $\Theta_{ref}$, and $\Theta_{ambient}$ at various time instants. The temperature determination module 202B and the data communication module 202A store the temperature data, the physical locations, and the temperatures $\Theta_{S1}$ and/or $\Theta_{S2}$, $\Theta_{ref}$ and $\Theta_{ambient}$ obtained in the parameter database 202F.

The feature vector generation module 202C generates feature vectors for the temperatures $\Theta_{S1}$ and/or $\Theta_{S2}$ using the reference temperature $\Theta_{ref}$ and the ambient temperature $\Theta_{ambient}$. The feature vector generation module 202C constructs feature vectors using correlation of the temperatures $\Theta_{S1}$ and/or $\Theta_{S2}$ with respect to the ambient temperature $\Theta_{ambient}$, and a correlation of the reference temperature $\Theta_{ref}$ with respect to the ambient temperature $\Theta_{ambient}$, over a time period, to ascertain presence of the fluid at each of the pre-determined locations where the sensors S1 and/or S2 are mounted on the electrical device.

The level prediction module 202D predicts a level of the fluid inside the electrical device, based on the feature vectors and historical temperature gradient data associated with the electrical device. The level prediction module 202D includes a gradient management module 202D1, a threshold determination module 202D2, and a parameter comparison module 202D3. The gradient management module 202D1 generates, using the historical temperature gradient data associated with the electrical device 500, a distribution of feature vectors for one or more of the temperatures $\Theta_{S1}$ and/or $\Theta_{S2}$. The threshold determination module 202D2 determines a fluid level threshold based on the distribution of the feature vectors. The parameter comparison module 202D3 compares the feature vectors with fluid level threshold to detect whether the fluid inside the electrical device is at a normal level or is lower than the normal level. The level prediction module 202D initiates one or more notifications based on the level of the fluid 106 predicted. The notifications include, for example, a fluid theft alarm, a low fluid level alarm, and/or a critical fluid level alarm. The data learning module 202E stores the feature vectors along with their distribution for normal operation of the electrical device and the low fluid level operation of the electrical device in the parameter database 202F.

Figure 2B:
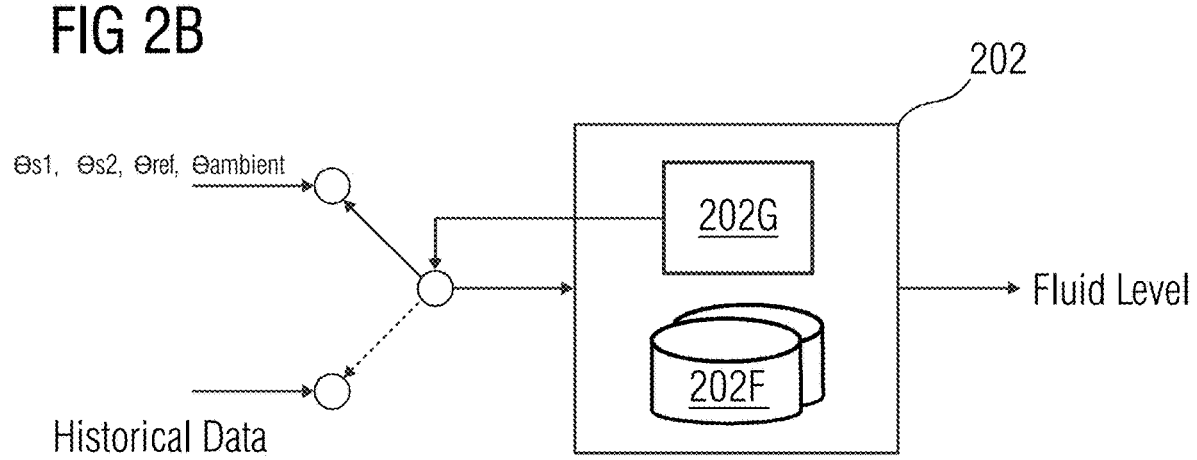

FIG. 2B depicts the fluid level estimation system 202 of the system 200 functioning in two modes, for example an operational mode and a learning mode. A mode selection module 202G selectively activates one of the two modes of operation for the fluid level estimation system 202, for example, based on a user input. The fluid level estimation system 202 in its learning mode, receives as an input the temperatures $\Theta_{S1}$ and/or $\Theta_{S2}$, the reference temperature $\Theta_{ref}$, and the ambient temperature $\Theta_{ambient}$. The fluid level estimation system 202 in its learning mode constructs feature vectors based on the temperatures $\Theta_{S1}$ and/or $\Theta_{S2}$, the reference temperature $\Theta_{ref}$, and the ambient temperature $\Theta_{ambient}$, and generates a distribution of the feature vectors for one or more of the temperatures $\Theta_{S1}$ and/or $\Theta_{S2}$. Further in the learning mode, the fluid level estimation system 202 determines a fluid level threshold based on the distribution of the feature vectors and stores in the parameter database 202F, the fluid level threshold and the feature vectors as historical temperature gradient data. In the operational mode, the fluid level estimation system 202 receives the historical temperature gradient data from the parameter database 202F along with the temperatures $\Theta_{S1}$ and/or $\Theta_{S2}$, the reference temperature $\Theta_{ref}$, and the ambient temperature $\Theta_{ambient}$ recorded in real time by the sensing unit 201. In the operational mode, the fluid level estimation system uses the inputs to predict a level of the fluid inside the electrical device based on the temperatures $\Theta_{S1}$ and/or $\Theta_{S2}$, $\Theta_{ref}$, and $\Theta_{ambient}$ using the fluid level threshold calculated while in the learning mode. In the operational mode, the fluid level estimation system 202 continuously updates its historical temperature gradient data with the feature vectors calculated in real time for enhancing accuracy of fluid level prediction.

Figure 3:
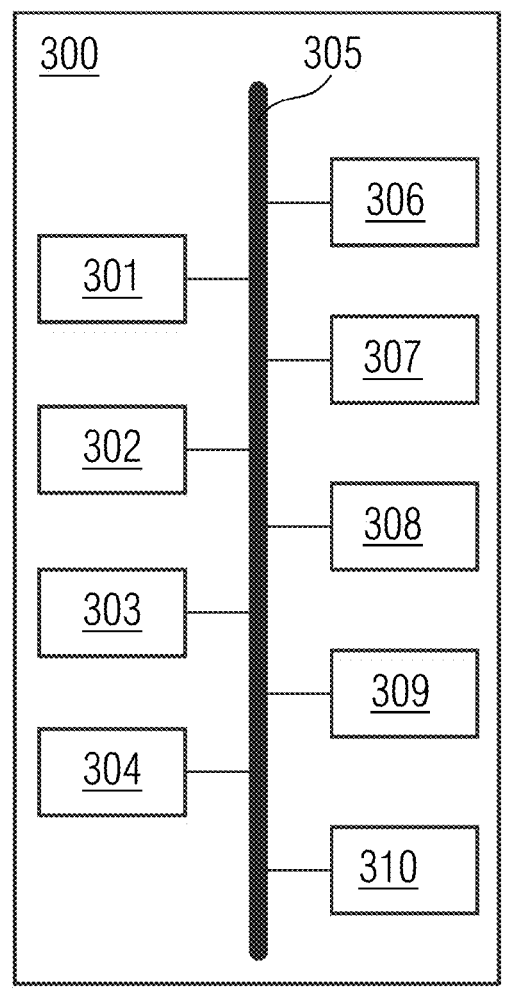
FIG. 3 depicts a block diagram illustrating architecture of a computer system employed by the fluid level estimation system illustrated in FIGS. 2A and 2B, for predicting a level of a fluid inside the electrical device according to an embodiment.

FIG. 3 depicts a block diagram illustrating architecture of a computer system 300 employed by the fluid level estimation system (FLES) 202 illustrated in FIGS. 2A and 2B, for predicting a level of a fluid inside an electrical device. The FLES 202 employs the architecture of the computer system 300. The computer system 300 is programmable using a high-level computer programming language. The computer system 300 may be implemented using programmed and purposeful hardware. As depicted in FIG. 3, the computer system 300 includes a processor 301, a non-transitory computer readable storage medium such as a memory unit 302 for storing programs and data, an input/output (I/O) controller 303, a network interface 304, a data bus 305, a display unit 306, input devices 307, a fixed media drive 308 such as a hard drive, a removable media drive 309 for receiving removable media, output devices 310, etc. The processor 301 refers to any one of microprocessors, central processing unit (CPU) devices, finite state machines, microcontrollers, digital signal processors, an application specific integrated circuit (ASIC), a field-programmable gate array (FPGA), etc., or any combination thereof, capable of executing computer programs or a series of commands, instructions, or state transitions. The processor 301 may also be implemented as a processor set including, for example, a general-purpose microprocessor and a math or graphics co-processor. The processor 301 is selected, for example, from the Intel® processors, Advanced Micro Devices (AMD®) processors, International Business Machines (IBM®) processors, etc. The FLES 202 is not limited to a computer system 300 employing a processor 301. The computer system 300 may also employ a controller or a microcontroller. The processor 301 executes the modules, for example, 202A, 202B, 202C, and 202D, 202E, 202G, etc., of the FLES 202.

The memory unit 302 is used for storing programs, applications, and data. For example, the data communication module 202A, the temperature determination module 202B, the feature vector generation module 202C, the level prediction module 202D, the data learning module 202E, the parameter database 202F, and the mode selection module 202G, of the FLES 202 are stored in the memory unit 302 of the computer system 300. The memory unit 302 is, for example, a random-access memory (RAM) or another type of dynamic storage device that stores information and instructions for execution by the processor 301. The memory unit 302 also stores temporary variables and other intermediate information used during execution of the instructions by the processor 301. The computer system 300 further includes a read only memory (ROM) or another type of static storage device that stores static information and instructions for the processor 301. The I/O controller 303 controls input actions and output actions performed by the FLES 202.

The network interface 304 provides connection of the computer system 300 to the communication network 203. For example, the data communication module 202A of the FLES 202 establishes a connection with the communication network 203 via the network interface 304. In an embodiment, the network interface 304 is provided as an interface card also referred to as a line card. The network interface 304 includes, for example, interfaces using serial protocols, interfaces using parallel protocols, and Ethernet communication interfaces, interfaces based on wireless communications technology such as satellite technology, radio frequency (RF) technology, near field communication, etc. The data bus 305 permits communications between the modules, for example, 202A, 202B, 202C, 202D, 202E, 202F, 202G, etc. of FLES 202.

The display unit 306, via a graphical user interface (GUI—not shown) of the FLES 202, displays information such as the physical locations of the sensors S1, S2, $S_{ref}$, $S_{ambient}$, etc., on the electrical device, the temperatures $\Theta_{S1}$, $\Theta_{S2}$, $\Theta_{ref}$ and $\Theta_{ambient}$ determined by the temperature determination module 202B, the feature vectors generated by the feature vector generation module 202C, the probability density function generated from a distribution of the feature vectors by the gradient management module 202D1, the fluid level determined by the level prediction module 202D, etc., via user interface elements such as graphs, text fields, buttons, windows, etc. The display unit 306 includes, for example, a liquid crystal display, a plasma display, an organic light emitting diode (OLED) based display, etc. The input devices 307 are used for inputting data into the computer system 300. The input devices 307 are, for example, a keyboard such as an alphanumeric keyboard, a touch sensitive display device, and/or any device capable of sensing a tactile input that could be used by the staff responsible for installing, commissioning, and/or maintenance of the electrical device.

Computer applications and programs are used for operating the computer system 300. The programs are loaded onto the fixed media drive 308 and into the memory unit 302 of the computer system 300 via the removable media drive 309. In an embodiment, the computer applications and programs may be loaded directly via the communication network 203. Computer applications and programs are executed by double clicking a related icon displayed on the display unit 306 using one of the input devices 307. The output devices 310 output the results of operations performed by the FLES 202. For example, the FLES 202 provides a graphical representation of the distribution generated based on the feature vectors by the gradient management module 202D1, using the output devices 310. In another example, the FLES 202 may provide an alarm indication and/or a notification based on level of the fluid within the electrical device using the output devices 310.

The processor 301 executes an operating system, for example, the Linux® operating system, the Unix® operating system, any version of the Microsoft® Windows® operating system, the Mac OS of Apple Inc., the IBM® OS/2, etc. The computer system 300 employs the operating system for performing multiple tasks. The operating system is responsible for management and coordination of activities and sharing of resources of the computer system 300. The operating system further manages security of the computer system 300, peripheral devices connected to the computer system 300, and network connections. The operating system employed on the computer system 300 recognizes, for example, inputs provided by the users using one of the input devices 307, the output display, files, and directories stored locally on the fixed media drive 308. The operating system on the computer system 300 executes different programs using the processor 301. The processor 301 and the operating system together define a computer platform for which application programs in high level programming languages are written.

The processor 301 of the computer system 300 employed by the FLES 202 retrieves instructions defined by the data communication module 202A, the temperature determination module 202B, the feature vector generation module 202C, the level prediction module 202D, the data learning module 202E, the mode selection module 202G, etc., of the FLES 202 for performing respective functions disclosed in the detailed description of FIG. 2A. The processor 301 retrieves instructions for executing the modules, for example, 202A, 202B, 202C, 202D, 202E, 202G, etc., of the FLES 202 from the memory unit 302. A program counter determines the location of the instructions in the memory unit 302. The program counter stores a number that identifies the current position in the program of each of the modules, for example, 202A, 202B, 202C, 202D, 202E, 202G, etc., of the FLES 202. The instructions fetched by the processor 301 from the memory unit 302 after being processed are decoded. The instructions are stored in an instruction register in the processor 301. After processing and decoding, the processor 301 executes the instructions, thereby performing one or more processes defined by those instructions.

At the time of execution, the instructions stored in the instruction register are examined to determine the operations to be performed. The processor 301 then performs the specified operations. The operations include arithmetic operations and logic operations. The operating system performs multiple routines for performing a number of tasks required to assign the input devices 307, the output devices 310, and memory for execution of the modules, for example, 202A, 202B, 202C, 202D, 202E, 202G, etc., of the FLES 202. The tasks performed by the operating system include, for example, assigning memory to the modules, for example, 202A, 202B, 202C, 202D, 202E, 202G, etc., of the FLES 202, and to data used by the FLES 202, moving data between the memory unit 302 and disk units, and handling input/output operations. The operating system performs the tasks on request by the operations and after performing the tasks, the operating system transfers the execution control back to the processor 301. The processor 301 continues the execution to obtain one or more outputs. The outputs of the execution of the modules, for example, 202A, 202B, 202C, 202D, 202E, 202G, etc., of the FLES 202 are displayed to the user on the GUI.

The detailed description refers to the FLES 202 being run locally on the computer system 300; however the scope is not limited to the FLES 202 being run locally on the computer system 300 via the operating system and the processor 301, but may be extended to run remotely over the communication network 203 by employing a web browser and a remote server, a handheld device, or other electronic devices. One or more portions of the computer system 300 may be distributed across one or more computer systems (not shown) coupled to the communication network 203.

Embodiments also provide a computer program product including a non-transitory computer readable storage medium that stores one or more computer program codes including instructions executable by at least one processor 301 for estimating a level of a fluid inside an electrical device. The computer program product includes computer program codes for performing respective functions of the modules 202A, 202B, 202C, 202D, 202E, 202G, etc., as disclosed in the detailed description of FIG. 2A. The computer program codes including computer executable instructions are embodied on the non-transitory computer readable storage medium. The processor 301 of the computer system 300 retrieves the computer executable instructions and executes them. When the computer executable instructions are executed by the processor 301, the computer executable instructions cause the processor 301 to perform the functions of the modules 202A, 202B, 202C, 202D, 202E, 202G, etc., as disclosed in the detailed description of FIG. 2A.

Figure 4:
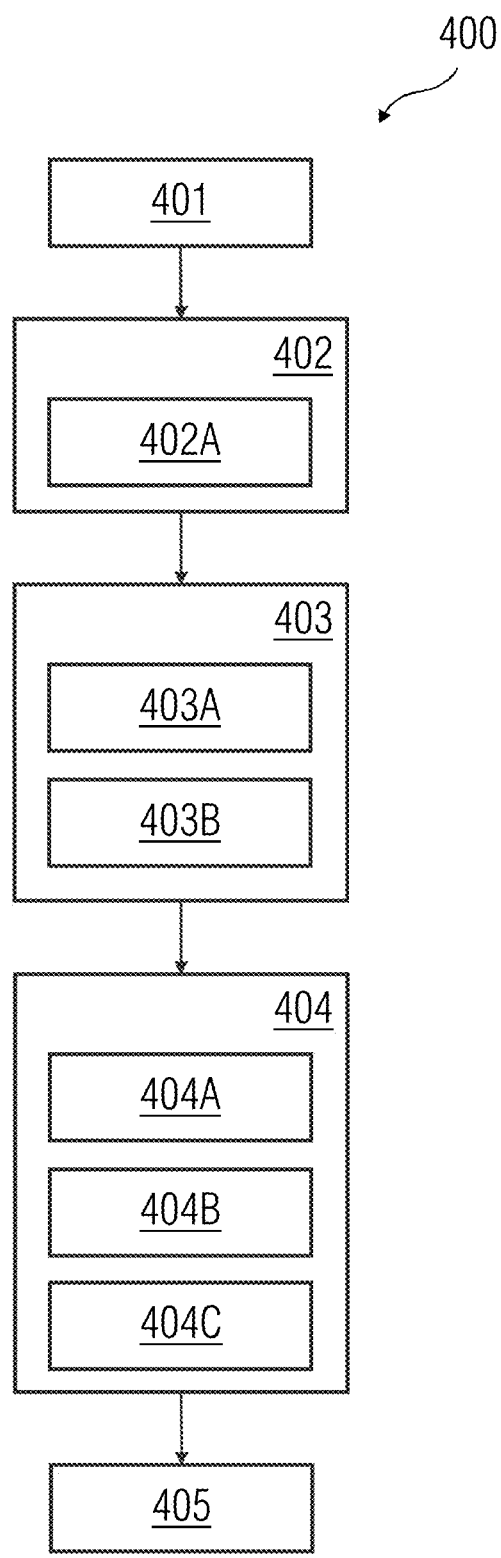
FIG. 4 depicts a process flowchart of a method for predicting performance of a fluid filled electrical device according to an embodiment.

FIG. 4 depicts a process flowchart 400 of a method for predicting performance of a fluid filled electrical device. At step 401, the method receives from a sensing unit 201 illustrated in FIG. 2A, temperature data associated with an ambient environment surrounding the electrical device recorded by a sensor $S_{ambient}$ of the sensing unit 201, and with fluid filled in the electrical device recorded by the sensors S1, S2, and $S_{ref}$ of the sensing unit 201 at predetermined locations on the electrical device.

At step 402, the method determines from the temperature data, temperatures $\Theta_{S1}$, $\Theta_{S2}$, $\Theta_{ref}$ and $\Theta_{ambient}$ at the pre-determined locations on the electrical device and the ambient environment surrounding the electrical device. For determining the temperatures $\Theta_{S1}$, $\Theta_{S2}$, $\Theta_{ref}$ and $\Theta_{ambient}$, the method at step 402A, processes the temperature data to filter noise and other background disturbances present, if any.

At step 403, the method generates feature vectors for one or more of the temperatures $\Theta_{S1}$, $\Theta_{S2}$, using the reference temperature $\Theta_{ref}$ and an ambient temperature $\Theta_{ambient}$. The method at step 403A, determines a correlation of at least one of the temperatures $\Theta_{S1}$ and $\Theta_{S2}$ with respect to the ambient temperature $\Theta_{ambient}$. The method at step 403B, determines a correlation of the reference temperature $\Theta_{ref}$ with respect to the ambient temperature $\Theta_{ambient}$, over a time period for which the temperatures are recorded by the sensing unit 201.

At step 404, the method predicts a level of the fluid inside the electrical device, based on the feature vectors and historical temperature gradient data associated with the electrical device. The method at step 401A, generates, using the historical temperature gradient data associated with the electrical device, a distribution of feature vectors for the temperatures $\Theta_{S1}$ and/or $\Theta_{S2}$. The method at step 403B, determines a fluid level threshold based on the distribution of the feature vectors. The method at step 403C, compares the feature vectors with fluid level threshold to predict whether the fluid level is below normal or at normal level.

At step 405, the method initiates one or more notifications based on the level of the fluid predicted. The notifications include, for example, a fluid theft alarm, a low fluid level alarm, a critical fluid level alarm, etc.

Figure 5A:
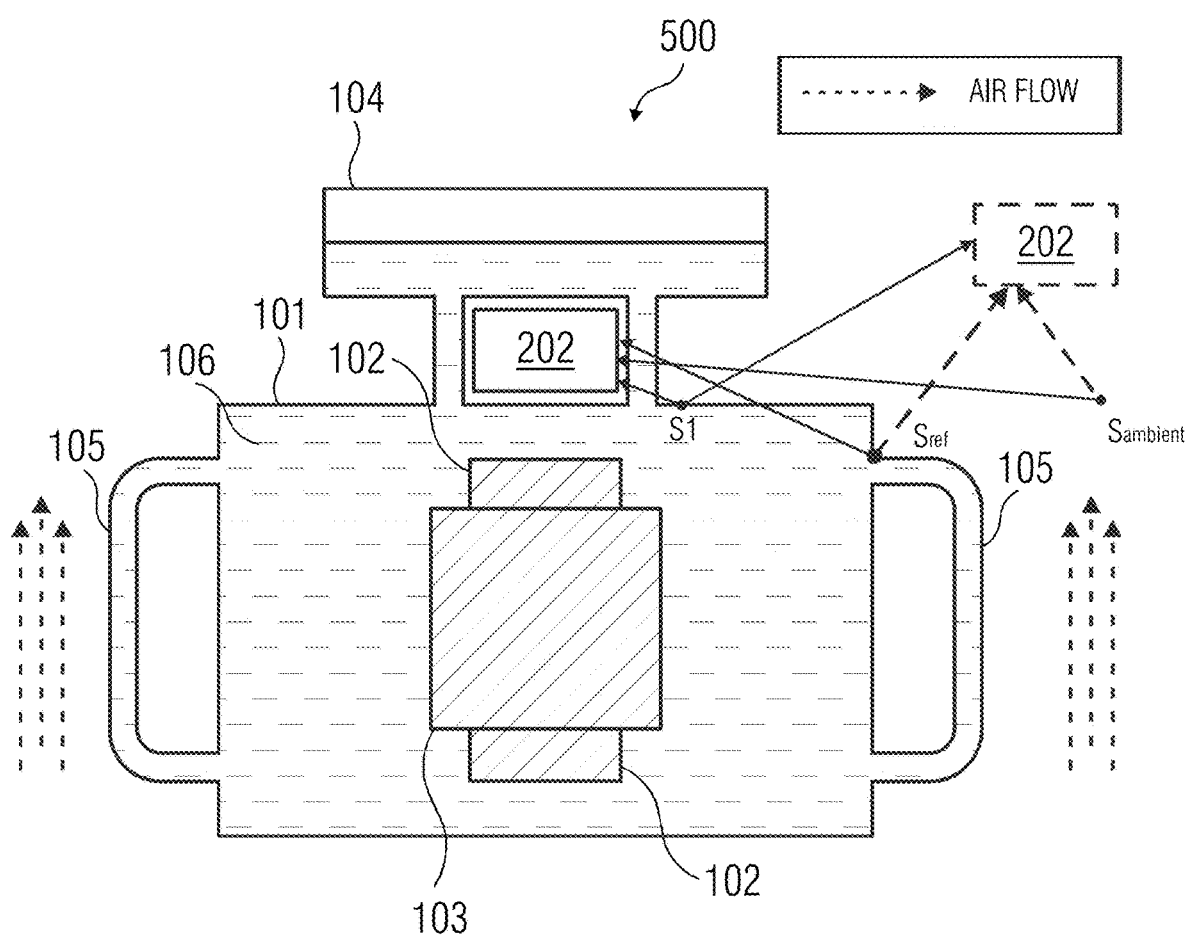
FIGS. 5A-5B depicts embodiments of a sensing unit deployable on an oil filled transformer including a housing, a core, at least one winding element, a conservator, and a cooling unit.
Figure 5B:
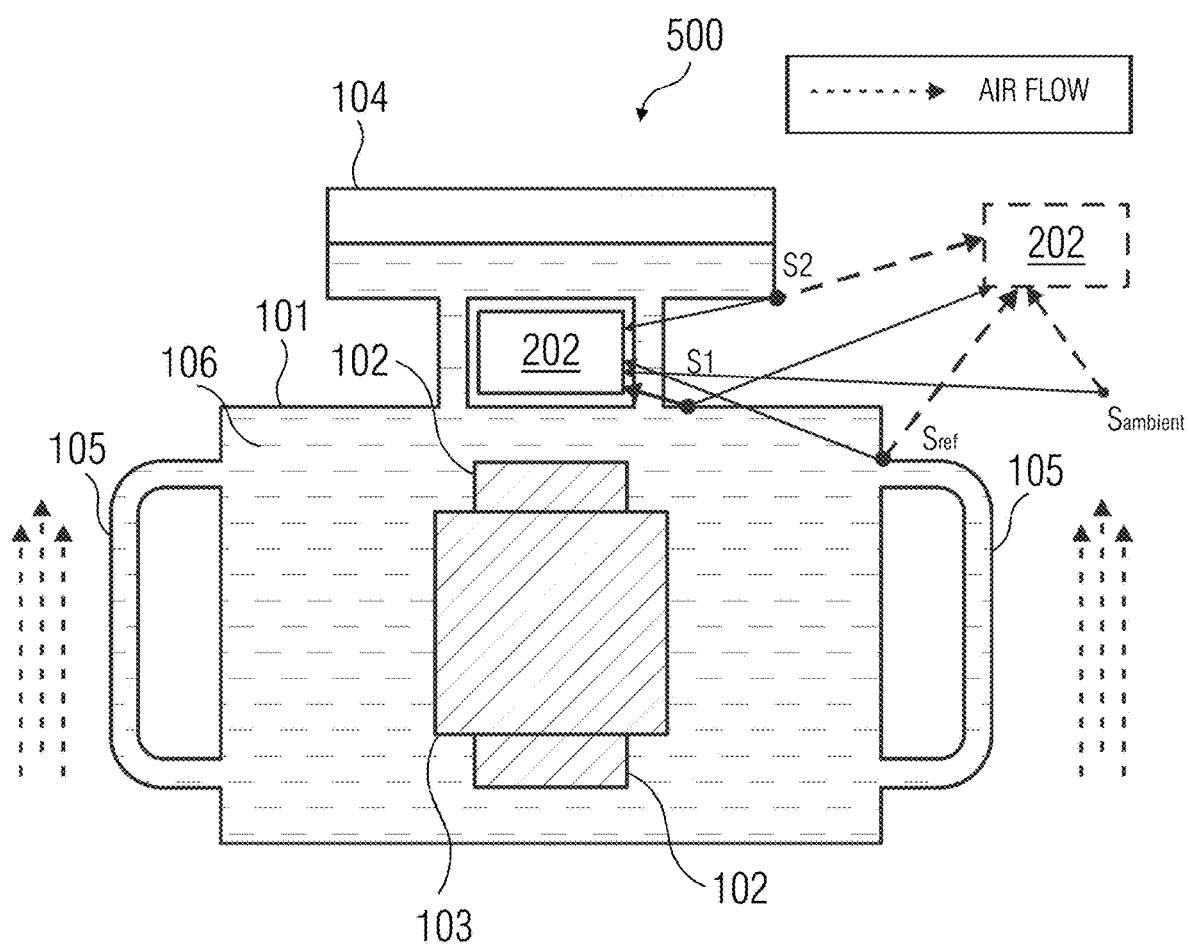

FIGS. 5A-5B depicts an active part of a transformer 500 as an embodiment of an electrical device, according to the present invention, including a housing 101, a core 102, at least one winding element 103, a conservator 104, and a cooling unit 105. FIG. 5A depicts a sensor S1 of the sensing unit 201 shown in FIG. 2A, physically mounted on the housing 101 for measuring a fluid temperature $\Theta_{S1}$. Another sensor $S_{ref}$ of the sensing unit 201, is physically mounted on the housing 101 near the cooling unit 105, that is, near a top end of the radiator fin 105 for measuring a reference temperature $\Theta_{ref}$ of the fluid 106 inside the transformer 500. A sensor $S_{ambient}$ of the sensing unit 201 is physically mounted in proximity of the transformer 500 for measuring an ambient temperature $\Theta_{ambient}$.

FIG. 5B depicts another embodiment of the sensing unit 201, according to the present invention, illustrating sensors S1, S2, $S_{ref}$, and $S_{ambinet}$ physically mounted on and around the transformer 500. The sensor S2 is physically mounted on the conservator 104 for measuring a temperature $\Theta_{S2}$ of the fluid 106 at a pre-determined location, that is, on the conservator 104. Temperatures measured by the sensors S1, S2, $S_{ref}$, and $S_{ambinet}$ are used by the fluid level estimation system 202 to predict a level of the fluid 106 inside the transformer 500. As shown in FIGS. 5A-5B, the fluid level estimation system 202 may either be physically mounted on the transformer 500 or reside external to the transformer 500 or reside in a cloud-based server (not shown). The sensors S1, S2, $S_{ref}$, and $S_{ambinet}$ communicate with the fluid level estimation system 202 via a wired and/or wireless communication network 203 illustrated in FIG. 2A.

Figure 6:
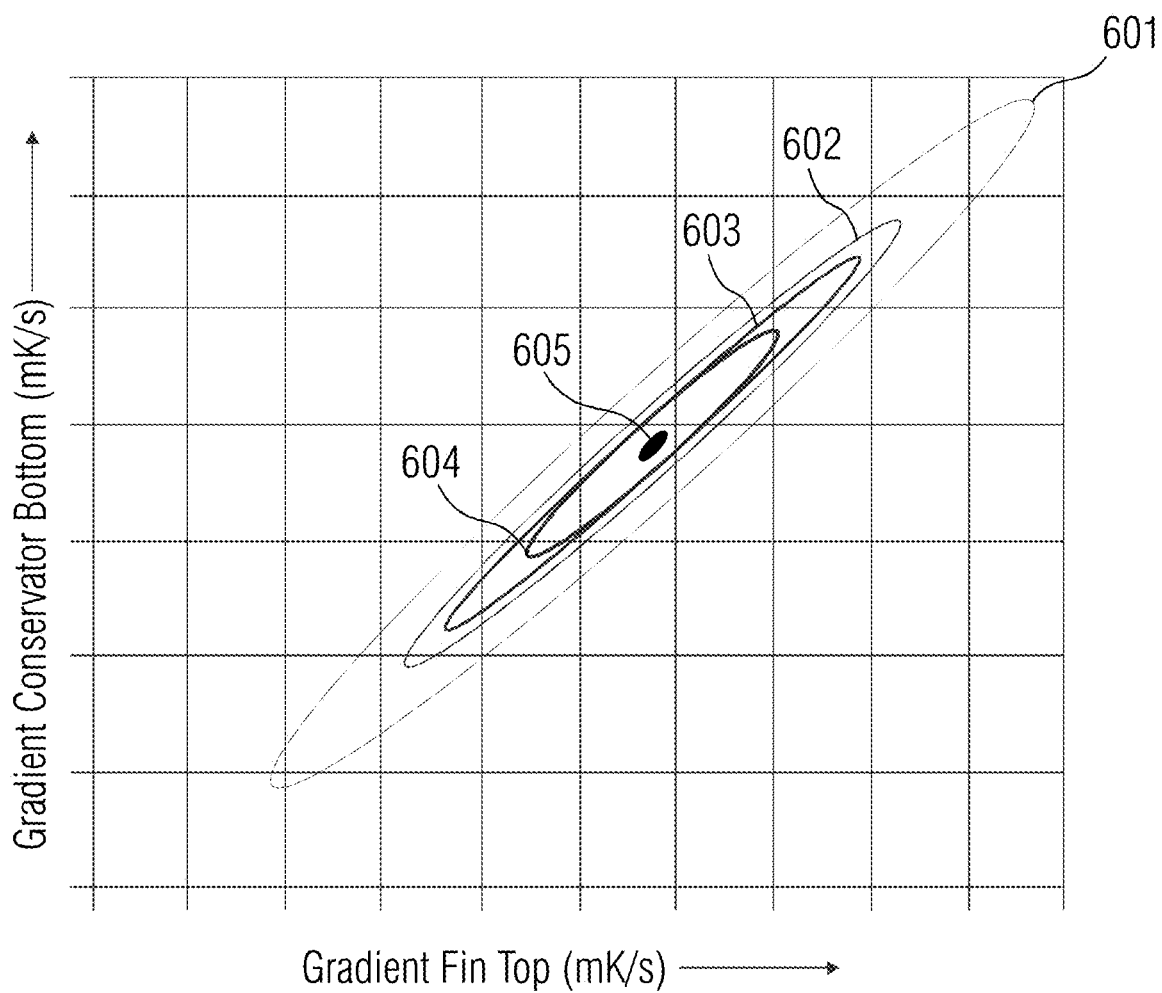
FIG. 6 depicts a graphical representation of a distribution of feature vectors associated with one or more fluid temperatures shown in FIGS. 5A-5B according to an embodiment.

FIG. 6 depicts a graphical representation of a distribution of feature vectors associated with one or more fluid temperatures. The distribution as shown in the FIG. 6 is constructed by the gradient management module 202D1 using historical temperature gradient data recorded by at least one of the sensors S1 and S2 with respect to the historical temperature gradient data recorded by the sensor $S_{ref}$ when physically mounted on a transformer 500 and stored in the parameter database 202F when the fluid level estimation system 202 is operating in a learning mode as shown in FIG. 2B. The distribution shown in FIG. 6 includes ellipses 601, 602, 603, and 604 for the feature vectors recorded over a time period in the learning mode of operation. The distribution is used to calculate a probability density function, that is, a multi-variate normal probability density function represented by a reference ellipse 605, that in turn is used as a boundary condition for computing a fluid level threshold. When the fluid level estimation system 202 is in operational mode then the feature vectors calculated for every incoming sensor reading are compared with the fluid level threshold to determine a normalcy of a level of fluid 106 inside the electrical device 500. Thus, the probability density function quantifies a normalcy of temperature data and in turn fluid level.

Figure 7:
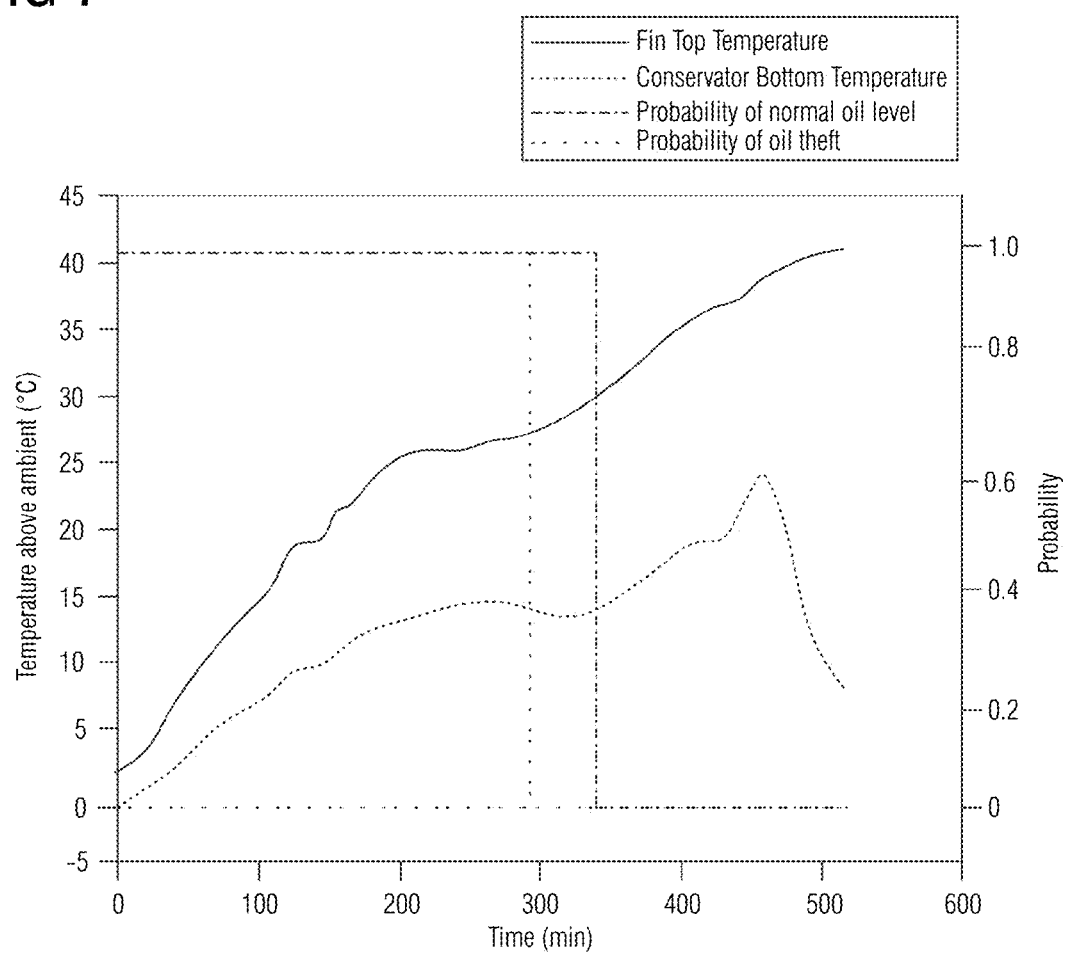
FIG. 7 depicts a graphical representation of a performance of an oil filled transformer based on prediction of oil level in the transformer according to an embodiment.

FIG. 7 depicts a graphical representation of a performance of an oil filled transformer 500 shown in FIGS. 5A-5B based on prediction of oil level in the transformer 500. FIG. 7 shows on Y axis, a correlation between the fluid temperature $\Theta_{S2}$ recorded at a bottom of the conservator 104, shown in FIGS. 5A-5B, and an ambient temperature $\Theta_{ambient}$ recorded in proximity of the transformer 500, plotted over a time period shown on X axis. FIG. 7 also shows on Y axis, a correlation between a reference temperature $\Theta_{ref}$ recorded at a top of the radiator fin 105 and the ambient temperature $\Theta_{ambient}$ plotted over a time period shown in X axis. Using the correlations, that is, feature vectors, the distribution of the same illustrated in FIG. 6, and the probability density function determined from the distribution, the fluid level estimation system 202 predicts events associated with fluid level, that is, a probability of normal oil level and a probability of oil theft from the transformer 500 as shown in FIG. 7.

The various methods, algorithms, and computer programs may be implemented on computer readable media appropriately programmed for computing devices. As used herein, "computer readable media" refers to non-transitory computer readable media that participate in providing data, for example, instructions that may be read by a computer, a processor, or a similar device. Non-transitory computer readable media include all computer readable media, for example, non-volatile media, volatile media, and transmission media, except for a transitory, propagating signal.

The computer programs that implement the methods and algorithms may be stored and transmitted using a variety of media, for example, the computer readable media in several manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes including computer executable instructions may be implemented in any programming language. The computer program codes or software programs may be stored on or in one or more mediums as object code. Various aspects of the method and system may be implemented in a non-programmed environment including documents created, for example, in a hypertext markup language (HTML), an extensible markup language (XML), or other format that render aspects of a graphical user interface (GUI) or perform other functions, when viewed in a visual area or a window of a browser program. Various aspects of the method and system may be implemented as programmed elements, or non-programmed elements, or any suitable combination thereof. The computer program product includes one or more computer program codes for implementing the processes of various embodiments.

Where databases are described such as the parameter database 202F, it will be understood by one of ordinary skill in the art that (i) alternative database structures to those described may be readily employed, and (ii) other memory structures besides databases may be readily employed. Any illustrations or descriptions of any sample databases are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries may be different from those disclosed herein. Further, despite any depiction of the databases as tables, other formats including relational databases, object-based models, and/or distributed databases may be used to store and manipulate the data types disclosed herein. Likewise, object methods or behaviors of a database may be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

Embodiments may be configured to work in a network environment including one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices includes processors, some examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, some examples of which are disclosed above. While the operating system may differ depending on the type of computer, the operating system will continue to provide the appropriate communications protocols to establish communication links with the network. Any number and type of machines may be in communication with the computers. Embodiments are not limited to a particular computer system platform, processor, operating system, or network. One or more aspects may be distributed among one or more computer systems, for example, servers configured to provide one or more services to one or more client computers, or to perform a complete task in a distributed system. For example, one or more aspects may be performed on a client-server system that includes components distributed among one or more server systems that perform multiple functions according to various embodiments. The components include, for example, executable, intermediate, or interpreted code, that communicate over a network using a communication protocol. Embodiments are not limited to be executable on any particular system or group of systems, and is not limited to any particular distributed architecture, network, or communication protocol.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A system for predicting performance of an electrical device filled with fluid, the system comprising:
    a sensing unit configured to record temperature data associated with at least an ambient environment surrounding the electrical device and with fluid filled in the electrical device at pre-determined locations on and around the electrical device; and
    a fluid level estimation system in communication with the sensing unit, the fluid level estimation system configured to:
        determine from the temperature data, temperatures at the pre-determined locations on and around the electrical device and an ambient temperature for the ambient environment surrounding the electrical device;
        generate feature vectors for one or more temperatures using reference temperatures and the ambient temperature; and
        predict a level of the fluid inside the electrical device based on the feature vectors and historical temperature gradient data associated with the electrical device.

2. The system of claim 1, wherein the sensing unit comprises:
    at least one first sensor physically mountable on a housing of the electrical device;
    at least one second sensor physically mountable on a cooling unit of the electrical device; and
    at least one third sensor physically mountable in proximity of the electrical device in the ambient environment surrounding the electrical device.

3. The system of claim 2, wherein the sensing unit further comprises a sensor physically mountable on a fluid storage component of the electrical device.

4. A fluid level estimation system for predicting a level of the inside an electrical device filled with fluid, the fluid level estimation system comprising:
    a non-transitory computer readable storage medium configured to store computer program instructions defined by a plurality of modules of the fluid level estimation system;
    at least one processor communicatively coupled to the non-transitory computer readable storage medium, the at least one processor configured to execute the plurality of modules of the fluid level estimation system; and
    the plurality of modules of the fluid level estimation system comprising:
        a data communication module configured to communicate with a sensing unit comprising a plurality of sensors deployable at pre-determined locations on and around the electrical device filled with fluid, and in proximity of the electrical device, the data communication module further configured to receive temperature data recorded by the plurality of sensors of the sensing unit;
        a temperature determination module configured to determine, by processing the temperature data, one or more temperatures associated with the fluid at the pre-determined locations on the electrical device and an ambient temperature of the ambient environment at the pre-determined locations around the electrical device;
        a feature vector generation module configured to generate feature vectors for one or more temperatures of the fluid, using a reference temperature of the fluid and the ambient temperature; and
        a level prediction module configured to predict a level of the fluid inside the electrical device based on the feature vectors and historical temperature gradient data associated with the electrical device.

5. The fluid level estimation system of claim 4, wherein the pre-determined locations comprise positions on the electrical device at which the plurality of sensors of the sensing unit are positioned.

6. The fluid level estimation system of claim 4, wherein the feature vector generation module is further configured to determine a correlation of at least one of the temperatures of the fluid with respect to the ambient temperature, and a correlation of the reference temperature with respect to the ambient temperature, over a time period.

7. The fluid level estimation system of claim 4, wherein the level prediction module comprises:
a gradient management module configured to generate, using the historical temperature gradient data associated with the electrical device, a distribution of feature vectors for one or more of the temperatures;
a threshold determination module configured to determine a fluid level threshold based on the distribution; and
a parameter comparison module configured to compare the feature vectors with the fluid level threshold.

8. The fluid level estimation system of claim 4, wherein the level prediction module is configured to initiate one or more notifications based on the level of the fluid predicted, wherein the one or more notifications comprise one or more of a fluid theft alarm, a low fluid level alarm, or a critical fluid level alarm.

9. An electrical device comprising:
a housing;
a core positioned inside the housing, wherein the core is at least partially immersed in a fluid;
at least one cooling unit connected to the housing, the at least one cooling unit configured to cool the fluid; and
a system deployed on and around the electrical device, the system comprising:
a sensing unit configured to record temperature data associated with an ambient environment surrounding the electrical device and with fluid filled in the electrical device at pre-determined locations on and around the electrical device; and
a fluid level estimation system in communication with the sensing unit, the fluid level estimation system configured to:
determine from the temperature data, temperatures at the pre-determined locations on and around the electrical device and an ambient temperature for the ambient environment surrounding the electrical device;
generate feature vectors for one or more temperatures using reference temperatures and the ambient temperature; and
predict a level of the fluid inside the electrical device based on the feature vectors and historical temperature gradient data associated with the electrical device.

10. The electrical device of claim 9, wherein the electrical device is a fluid cooled electrical device.

11. A method for predicting performance of an electrical device filled with fluid, the method comprising:
receiving from a sensing unit temperature data associated at least with an ambient environment surrounding the electrical device and with fluid filled in the electrical device at pre-determined locations on and around the electrical device;
determining from the temperature data, temperatures at the pre-determined locations on and around the electrical device and an ambient temperature for the ambient environment surrounding the electrical device;
generating feature vectors for one or more temperatures using reference temperatures and the ambient temperature; and
predicting a level of the fluid inside the electrical device based on the feature vectors and historical temperature gradient data associated with the electrical device.

12. The method of claim 11, wherein generating the feature vectors comprises determining a correlation of at least one of the temperatures with respect to the ambient temperature and a correlation of the reference temperatures with respect to the ambient temperature over a time period.

13. The method of claim 11, wherein predicting the level of the fluid inside the electrical device comprises:
generating, using the historical temperature gradient data associated with the electrical device, a distribution of feature vectors for one or more of the temperatures;
determining a fluid level threshold based on the distribution; and
comparing the feature vectors with the fluid level threshold.

14. The method of claim 11, further comprising initiating one or more notifications based on the level of the fluid predicted, wherein the notifications comprise one or more of a fluid theft alarm, a low fluid level alarm, or a critical fluid level alarm.

* * * * *